(12) United States Patent
Bagepalli et al.

(10) Patent No.: US 7,427,814 B2
(45) Date of Patent: Sep. 23, 2008

(54) WIND TURBINE GENERATORS HAVING WIND ASSISTED COOLING SYSTEMS AND COOLING METHODS

(75) Inventors: Bharat Bagepalli, Niskayuna, NY (US); Gary R. Barnes, Delanson, NY (US); Aniruddha D. Gadre, Rexford, NY (US); Patrick L. Jansen, Scotia, NY (US); Charles G. Bouchard, Jr., Schenectady, NY (US); Emil D. Jarczynski, Scotia, NY (US); Jivtesh Garg, Cambridge, MA (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 11/385,730

(22) Filed: Mar. 22, 2006

(65) Prior Publication Data
US 2007/0222223 A1    Sep. 27, 2007

(51) Int. Cl.
*F03D 9/00* (2006.01)
*H02P 9/04* (2006.01)

(52) U.S. Cl. .......................................... 290/55; 290/44

(58) Field of Classification Search ................... 290/44, 290/43, 55, 54; 416/132 B; 415/2.1, 4.2, 415/4.5, 907, 7; 60/398
See application file for complete search history.

(56) References Cited

U.S. PATENT DOCUMENTS

| | | | | |
|---|---|---|---|---|
| 1,699,949 A * | 1/1929 | Bucklen | ....................... | 290/55 |
| 2,305,256 A * | 12/1942 | Hodges | ..................... | 188/72.3 |
| 4,740,711 A * | 4/1988 | Sato et al. | ...................... | 290/52 |
| 4,767,939 A * | 8/1988 | Calley | .......................... | 290/55 |
| 6,278,197 B1 * | 8/2001 | Appa | .......................... | 290/55 |
| 6,483,199 B2 * | 11/2002 | Umemoto et al. | ............. | 290/55 |
| 6,676,122 B1 * | 1/2004 | Wobben | ....................... | 290/55 |
| 6,903,466 B1 * | 6/2005 | Mercier et al. | ................. | 290/44 |
| 7,154,191 B2 * | 12/2006 | Jansen et al. | ................... | 290/55 |
| 7,154,192 B2 * | 12/2006 | Jansen et al. | ................... | 290/55 |
| 2001/0035651 A1 * | 11/2001 | Umemoto et al. | ............. | 290/44 |
| 2004/0041408 A1 * | 3/2004 | Casazza | ....................... | 290/55 |
| 2005/0186076 A1 * | 8/2005 | Hessel | .................... | 416/132 B |
| 2006/0071575 A1 * | 4/2006 | Jansen et al. | ................. | 310/266 |

* cited by examiner

*Primary Examiner*—Julio C. Gonzalez Ramirez
(74) *Attorney, Agent, or Firm*—Nixon & Vanderhye PC

(57) ABSTRACT

A wind generator includes: a nacelle; a hub carried by the nacelle and including at least a pair of wind turbine blades; and an electricity producing generator including a stator and a rotor carried by the nacelle. The rotor is connected to the hub and rotatable in response to wind acting on the blades to rotate the rotor relative to the stator to generate electricity. A cooling system is carried by the nacelle and includes at least one ambient air inlet port opening through a surface of the nacelle downstream of the hub and blades, and a duct for flowing air from the inlet port in a generally upstream direction toward the hub and in cooling relation to the stator.

12 Claims, 8 Drawing Sheets

WIND TURBINE GENERATORS HAVING WIND ASSISTED COOLING SYSTEMS AND COOLING METHODS

This invention was made with Government support under Subcontract ZAM-4-31235-05 awarded by NREL and under Prime contract DE-AC36-99-G010337 awarded by U.S. Department of Energy. The government has certain rights in the invention.

BACKGROUND OF THE INVENTION

The present invention relates to wind assisted cooling for wind turbine generators and particularly relates to a cooling system which utilizes flow induced pressure and suction to receive cooling air from the ambient environment and routes the cooling air to the wind generator parts susceptible to thermal related degradation.

Wind turbine generators typically stand on pylons hundreds of feet in the air. The generators include a hub mounting two or typically three airfoil blades which drive the generator. Within the nacelle mounting the hub, a rotor is rotated by the airfoil blades and hub. Rotation of the rotor either through a direct drive system or a gearbox causes relative rotation between magnetic poles and coils to generate electricity. In the direct drive generator, the rotor rotates at the same speed as the blades rotate and consequently a large radius is required to obtain the tangential velocity required to produce electricity. A gearbox of course, increases the rotational speed to a high value, e.g., 1000 RPM which itself causes problems.

As with any generator, heat is generated and it is necessary to cool the various parts of the generator. The cooling of a wind generator must be done efficiently to minimize losses and it will be appreciated that space restrictions prevent the use of elaborate cooling pipes, blowers, filters, heat exchangers and the like to facilitate cooling. Traditional generator cooling apparatus has been bulky, expensive and difficult to maintain. Because of the nature of wind turbine generators and the need to locate the generators hundreds of feet above ground while at the same time providing cooling for the generator, there is an established need to provide an improved cooling system for wind turbine generators e.g., to utilize wind flow around the nacelle to assist airflow ingestion into and exhaustion of heated air from the nacelle for purposes of cooling the generator.

BRIEF DESCRIPTION OF THE INVENTION

In one exemplary but non-limiting embodiment of the invention, there is provided a wind generator comprising a nacelle; a hub rotatably carried by the nacelle and including at least a pair of wind turbine blades; an electricity producing generator including a stator and a rotor, the rotor being connected to the hub and rotatable in response to wind acting on the blades to rotate the rotor relative to the stator to generate electricity; and a cooling system carried by the nacelle including at least one ambient air inlet port opening through a surface of the nacelle downstream of the hub and blades, and a duct for flowing air from the inlet port in a generally upstream direction toward the hub and in cooling relation to the stator.

In another exemplary but non-limiting embodiment, there is provided a method of cooling the stator of a wind turbine generator having a nacelle carrying the stator and a rotor connected to a hub mounting wind turbine blades, comprising the steps of (a) suctioning ambient cooling air through a forward-facing inlet port along a surface of the hub or nacelle; (b) flowing the cooling air through the generator stator to cool the stator; and (c) exhausting the cooling air from the stator at a location downstream of the hub and blades.

In a further exemplary but non-limiting embodiment, the inlet port is in the nacelle at a location downstream of the hub and blades.

The invention will now be described in detail in connection with the drawings identified below.

DETAILED DESCRIPTION OF THE INVENTION

Figure 1:
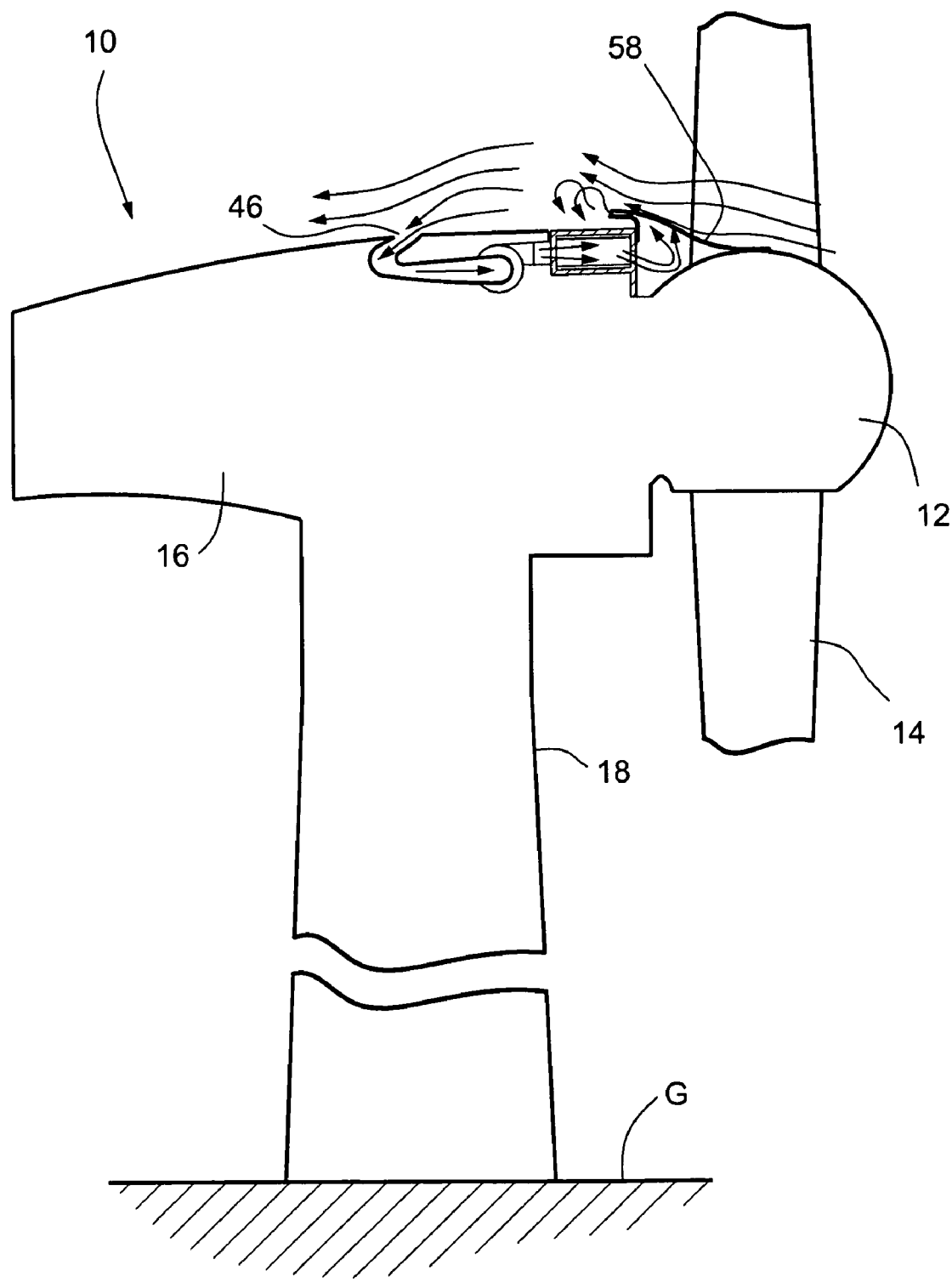
FIG. 1 is a schematic representation of a wind assisted cooling system for a wind turbine generator.

Referring to FIG. 1, there is schematically illustrated a wind turbine generator, generally designated 10, and including a rotating hub 12 mounting two or more airfoil shaped blades 14, a fixed nacelle 16 and a pylon 18 for structurally supporting the wind turbine generator hundreds of feet above ground level G.

Figure 3:
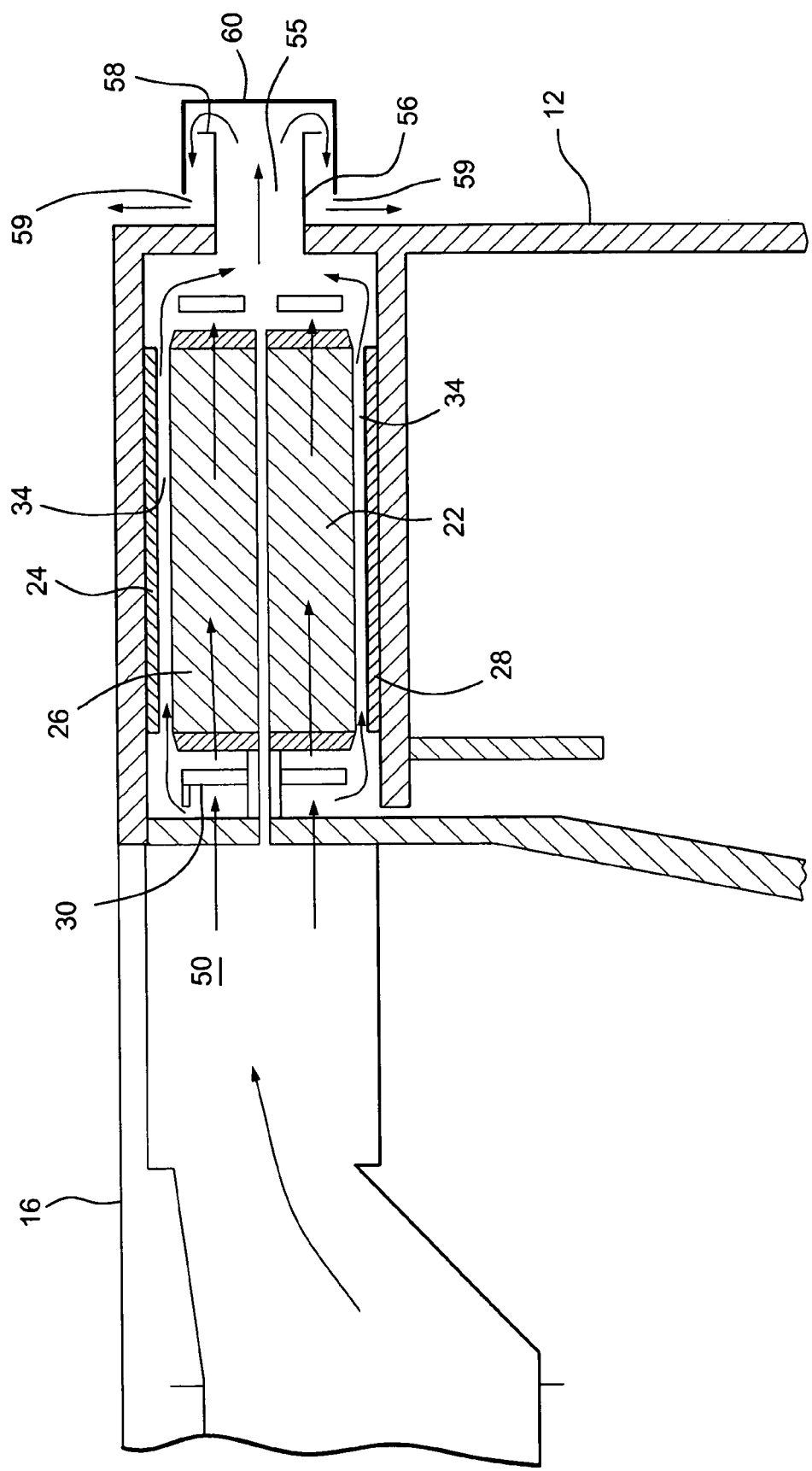
FIG. 3 is an enlarged fragmentary cross-sectional view of a portion of the stator and rotary components of the generator illustrating a portion of the cooling circuit.
Figure 4:
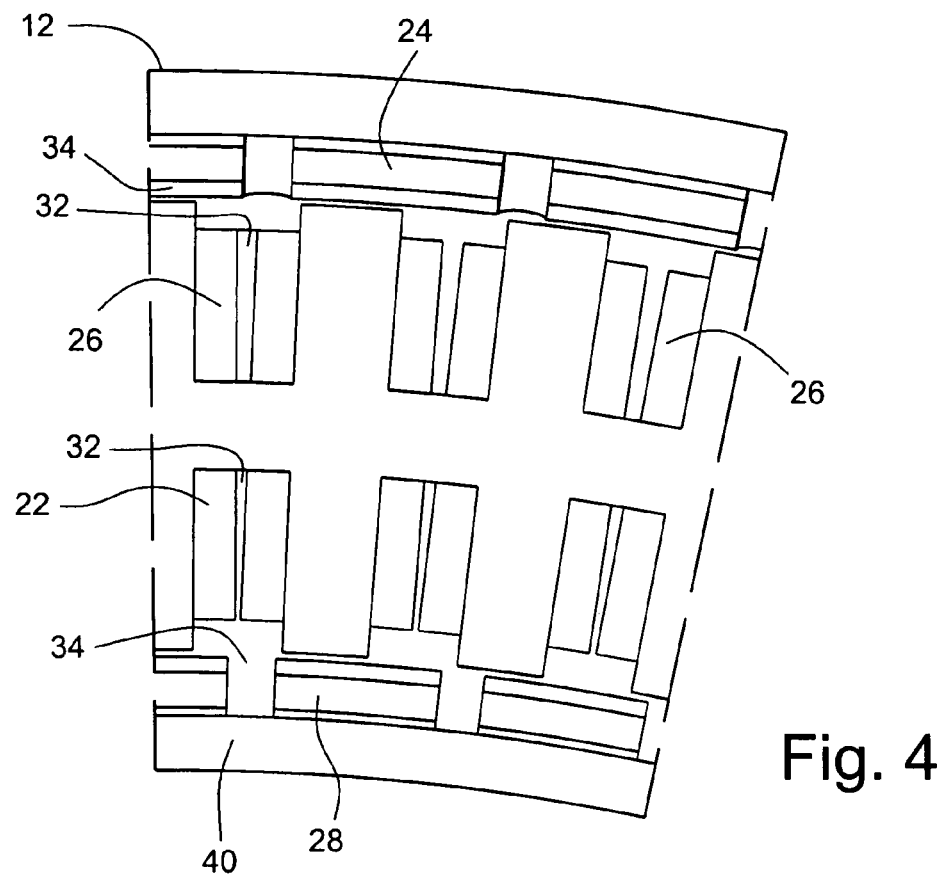
FIG. 4 is an enlarged endwise schematic representation of the double-sided generator employed in the cooling system hereof.
Figure 5:
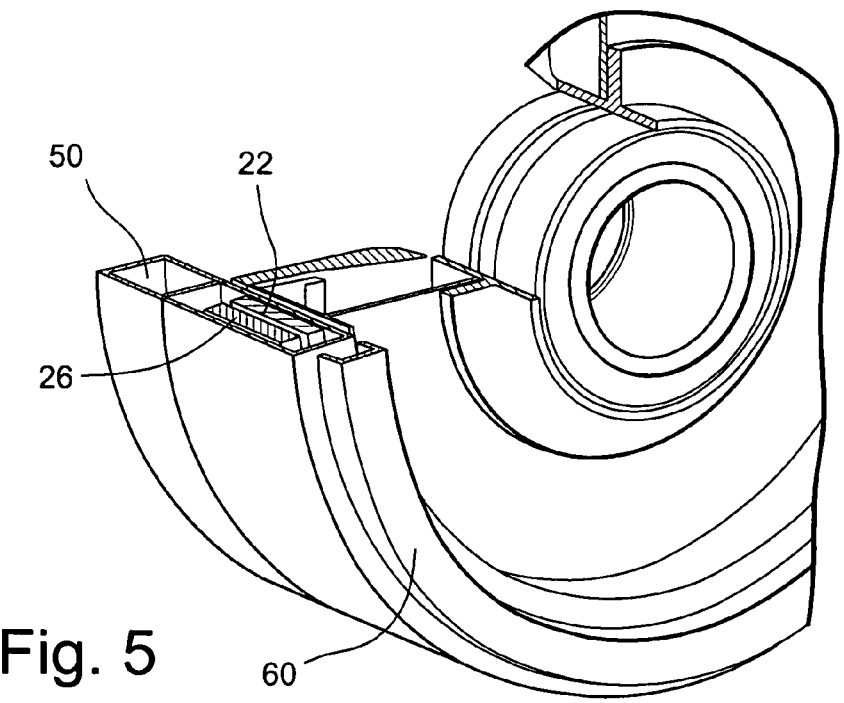
FIG. 5 is a fragmentary perspective view illustrating the various components of the wind assisted cooling system for the wind turbine generator hereof.

Referring to FIGS. 3-5, the nacelle 16 mounts a plurality of coils, or windings 22 forming part of the stator and a plurality of magnets or poles 24 about the rotor adjacent a forward part of the rotor near the hub 12. The illustrated present embodiment includes a double-sided generator having, as part of the stator, inner stator coils 22 and outer stator coils 26 and, as part of the rotor, outer magnets or poles 24 and inner magnets or poles 28. Thus the wind driven blades 14 drive the hub 12 which, in turn, rotates the outer and inner magnets 24 and 28 relative to the outer and inner stator coils 26 and 22 to generate electricity. It will be appreciated that the inner and outer stator coils 22 and 26 respectively constitute generally elliptically or oval shaped coils spaced circumferentially one from the other about the generator stator. The stator coils are also mounted on a yolk 30 fixed to the nacelle 16. It will be appreciated from a review of FIGS. 3 and 4, that there are gaps 32 between the individual coils in both the inner and outer coils 22, 26. There are also axial gaps 34 between the outer portion of the rotor and the outer coils 26 as well as between the inner portion of the rotor 40 of the inner coils 22, which provide flow paths for flowing a cooling fluid, in this instance air.

Figure 2:
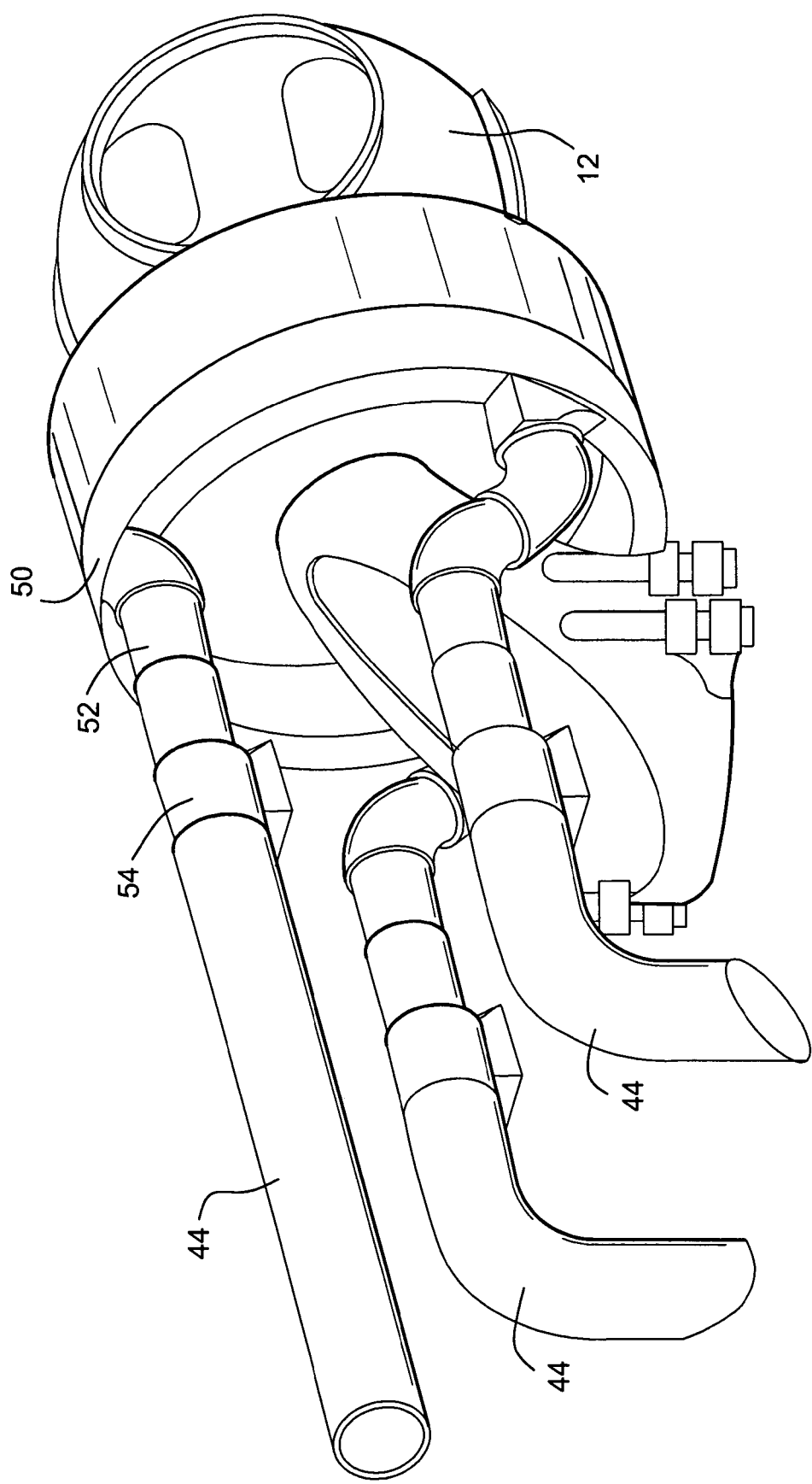
FIG. 2 is a perspective view illustrating portions of the cooling system for the wind turbine generator.

Referring to FIGS. 1-3, the cooling system includes a plurality of air intakes 44, three being shown in FIG. 2. The intakes 44 constitute pipes for transmitting air received in an inlet 46 (FIG. 1) opening along the surface of the nacelle 16. Thus, three inlets 46 are circumferentially spaced one from the other about the nacelle, for example about 120 degrees apart for receiving air passing over the nacelle 16. Because of the shape of the nacelle 16 and the aerodynamic boundary layer flow along the surface of the nacelle, the inlets suction a part of the boundary layer flow forward of the inlets for transmission along the pipes 44 to an inlet manifold 50 (FIG. 3). Manifold 50 comprises an annulus of similar diameter as the stator coils and is spaced behind the inner and outer stator coils 22 and 26. The manifold 50 may be continuous or segregated into compartments of equal circumferential lengths for providing cooling air to an associated segment of the stator coils axially forwardly of the inlet manifold 50. Since the flow of inlet air per se is not sufficient to maintain the generator in a cooled condition, the inlet air flow is augmented by blowers 52 (FIG. 2) disposed in the pipes 44 in advance of the inlet manifold 50. Various filters 54 are also placed in the inlet pipes 44.

On the axially forward side of the generator, there are provided a plurality of circumferentially spaced outlets 55 each including an exhaust pipe 56 and an exhaust collar, collectively called an exhaust can 58. An annular generally C-shaped channel 60 overlies the exhaust can 58 on the outlet side of the cans 58. The base of the channel 60 is spaced from and overlies the exhaust outlets of the exhaust pipe 56. Channel 60 also has free side edges spaced axially from the forward face of the rotating component providing generally radially extending heated cooling air exhaust passages 59. Thus the heated cooling air exits the exhaust pipe 56 and turns 180 degrees for flow axially back towards the stator and then turns 90 degrees for radial egress into the atmosphere. Consequently, the exhaust flow of cooling air is essentially annular about the surface of nacelle.

It will be appreciated that the cooling system illustrated in FIGS. 1-5 may be characterized as a front exit system. Such system has various advantages. For example, the components of the system are enclosed within the nacelle and are thus protected from outside elements. The generator elements, e.g., the rotor coils 22, 26 can be easily replaced. The C-shaped channel also not only protects the individual exhaust pipes and collars but diverts the exiting flow back towards the nacelle. An annular flow director 58 is illustrated in FIG. 1 to facilitate airflow over the step in the rotor between the hub and the magnetic poles. Thus the air exiting the C-shaped channel is essentially sucked from the channel to join the boundary layer flow along the outer surface of the nacelle.

Figure 6:
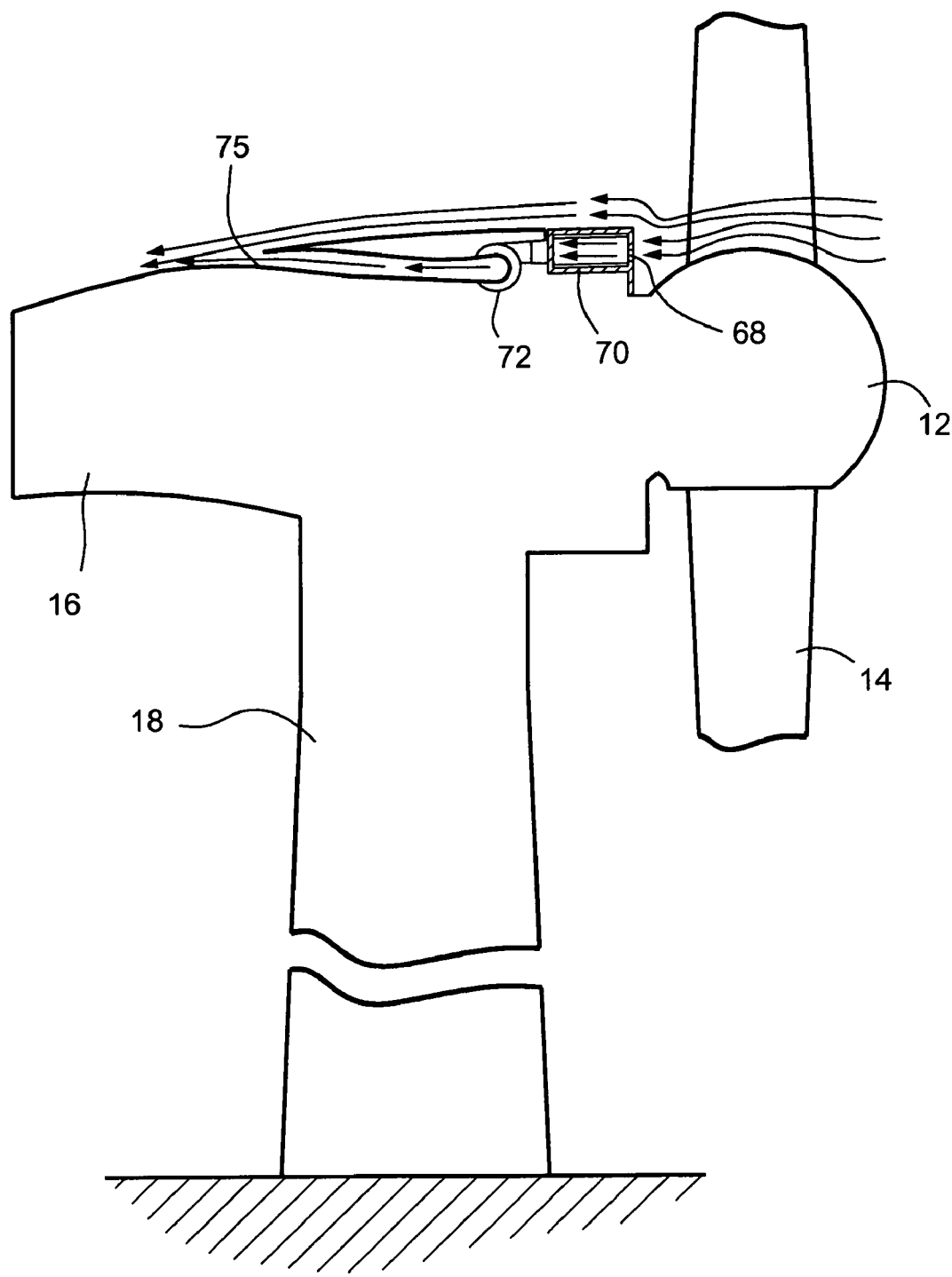
FIG. 6 is a schematic representation of a further exemplary embodiment of a wind assisted cooling system for a wind turbine generator.

Referring to the embodiment illustrated in FIG. 6, there is disclosed a rear exit cooling system for a wind turbine. In this configuration, cooling air enters through entry ports 68 along the front face of the annular compartment 70 housing the stator coils to cool the stator coils substantially by air flow in the reverse direction than the direction of air flow in the previous embodiment. The heated air from the cooling flow about the stator coils 22, 26 constitutes a rear exit approach using the pressure head due to the wind at the entry ports 68. In this embodiment, one or more of a blower, internal vented laminations and an encased external fan may be used to assist the cooling air flow. For example, blowers 72 may augment the passage of air from the front entry ports to the rear exit port 75.

Figure 7:
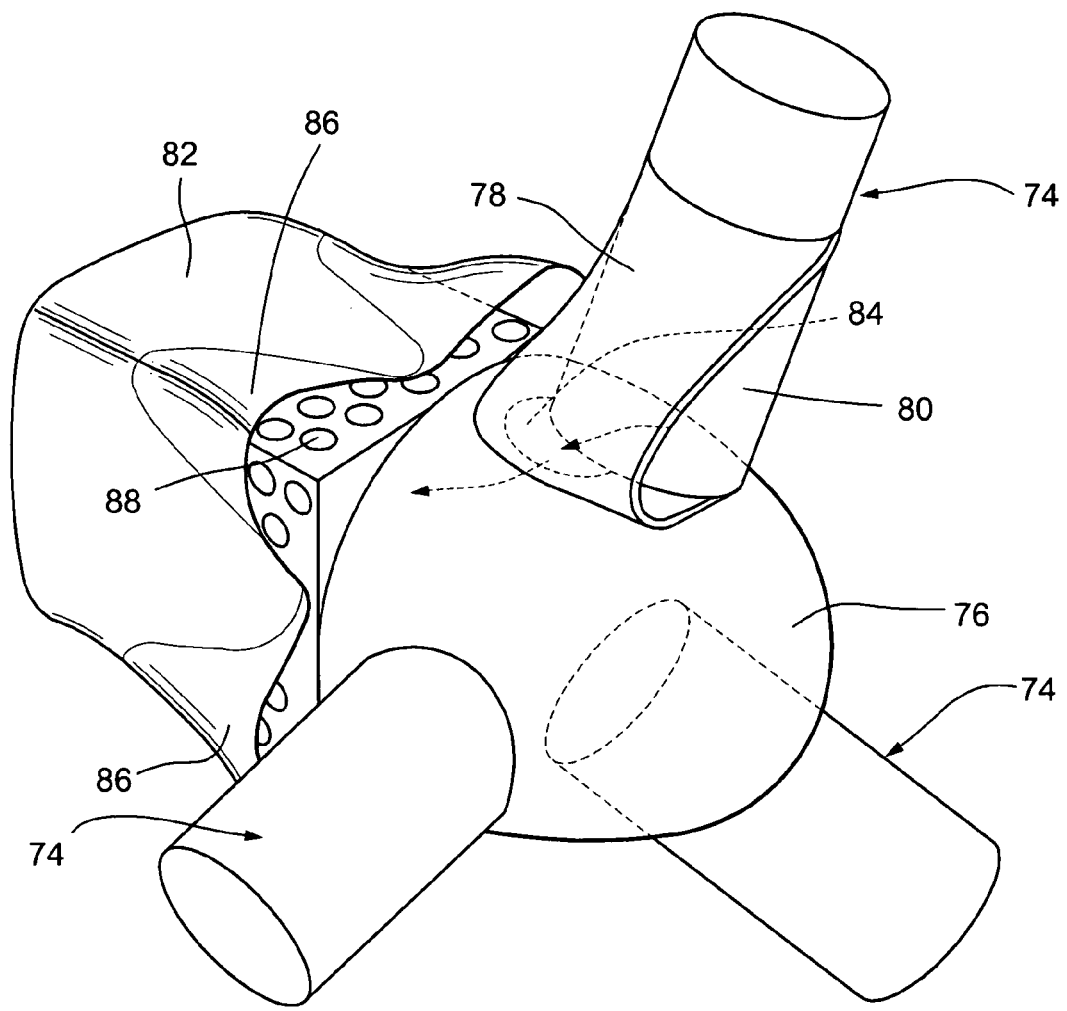
FIG. 7 is a partial perspective view of a hub and nacelle with cooling air inlet configuration in accordance with another exemplary embodiment.

Variations of the above described cooling inlet configurations are disclosed in FIGS. 7-10. In FIG. 7, blade root and nacelle ducts are employed to ingest wind air for nacelle and hub cooling. More specifically, the blade roots 74, where the blades are attached to the hub 76, are each provided with a duct 78 (one shown) with an inlet opening 80 facing forward (upstream of the nacelle 82). The duct 78 feeds ingested wind air into a hub duct 84 that, in turn feeds cooling air to the annular manifold or plenum 70 as described in connection with FIG. 6.

Additional cooling wind air may be ingested via nacelle scoops 86 that also open in a forward direction. The number of scoops 86 may be varied about the periphery of the nacelle, but with preferably in a symmetrical array. The array in FIG. 7 includes four such scoops (three shown). Scoops 86 feed the cooling air through cooling air intake holes 88 in the nacelle wall to join the cooling air entering the blade root ducts flowing to the manifold or plenum 70.

Figure 8:
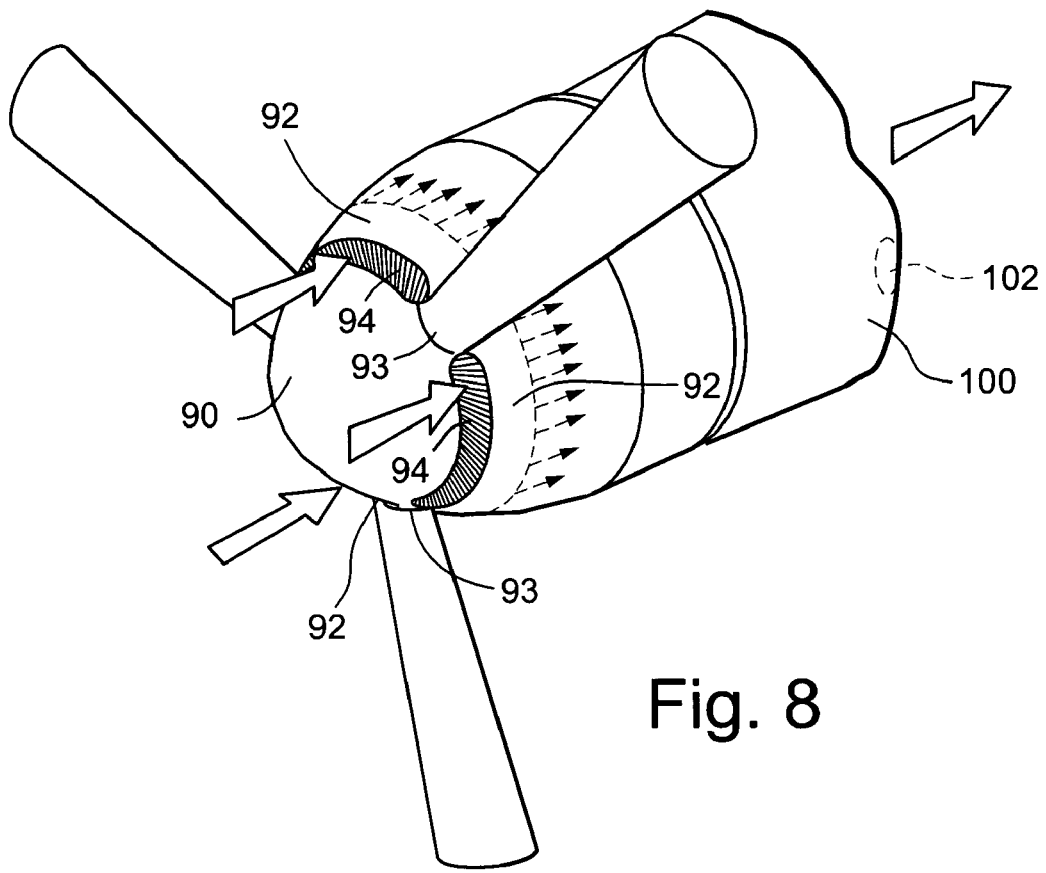
FIG. 8 is a perspective view of a cooling air inlet arrangement in the hub in accordance with still another exemplary embodiment.
Figure 9:
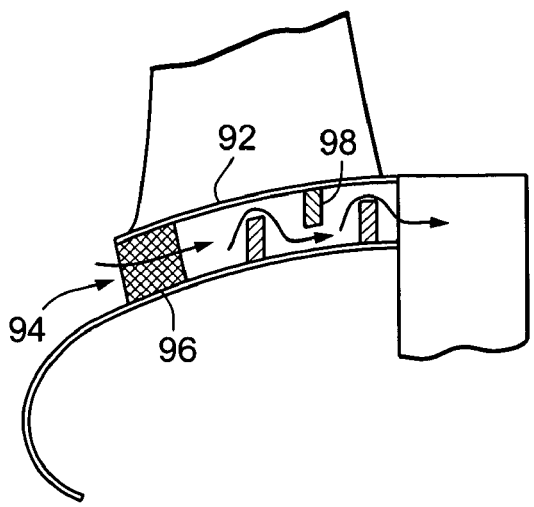
FIG. 9 is a fragmentary cross-section of the hub shown in FIG. 8.

FIGS. 8 and 9 illustrate a hub 90 formed with three hub ducts 92 (two shown), located circumferentially between the blade roots 93. Each hub duct has a forwardly facing inlet opening 94. Each duct maybe provided with a filter 96 at the inlet opening, as well as a plurality of internal baffles 98 arranged to form a serpentine flow path for the cooling air. The ninety degree bends in the flow path helps remove moisture from the air prior to entering the annular chamber 70. After passing through the generator, the cooling air will exit the nacelle 100 via rear exit vents 102 (one shown in phantom).

Figure 10:
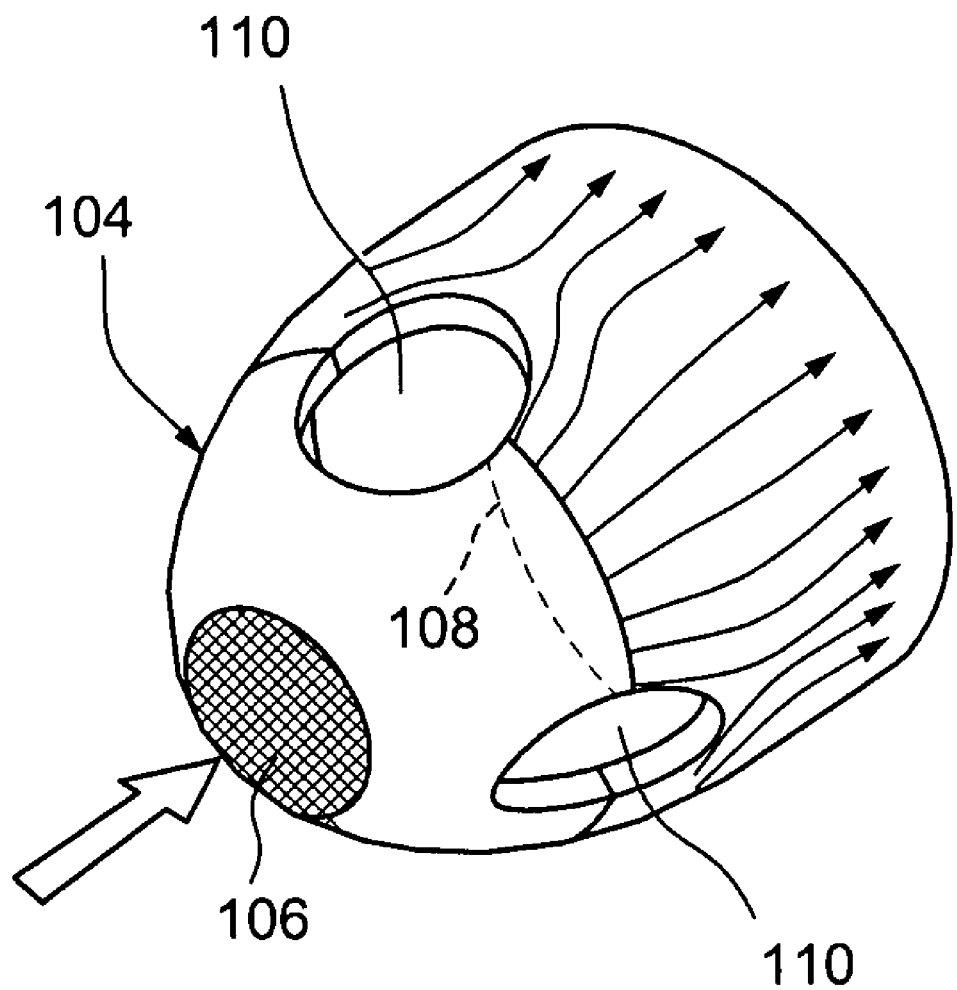
FIG. 10 is a partial perspective view of a cooling air inlet in a hub in accordance with yet another embodiment of the invention.

FIG. 10 illustrates a hub 104 provided with a single forwardly-facing air intake 106 in the center of the hub. The cooling air flows through internal openings 108 between the blade root holes 110 and into the nacelle and the annular chamber 70.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wind generator comprising:
   a nacelle;
   a hub rotatably carried by said nacelle and including at least a pair of wind turbine blades;
   an electricity producing generator including a stator and a rotor carried by said nacelle, adjacent to and downstream of said hub, said rotor being connected to the hub and rotatable in response to wind acting on said blades to rotate the rotor relative to the stator to generate electricity; and
   a cooling system carried by the nacelle including at least one forward facing ambient air inlet port opening through a surface of said nacelle downstream of said hub and blades, and a duct for reverse flowing air from said inlet port in a generally upstream direction through said generator toward said hub and to an air outlet port located forward of the generator stator.

2. A generator according to claim 1 wherein said air inlet port opens into a manifold for distribution about the stator.

3. A generator according to claim 1 wherein said air outlet port distributes heated air received from the stator to atmosphere at a location behind the hub.

4. A generator according to claim 1 including a plurality of circumferentially spaced outlet ports located behind said hub and forwardly at the generator stator for directing heated cooling air in a forward upstream direction, and an annular chamber overlying the outlet ports for redirecting the heated cooling air in a generally downstream direction for flow about the nacelle.

5. A generator according to claim 1 wherein said at least one inlet port comprises a plurality of inlet ports about the surface of the nace downstream of the generator stator and the hub, and one or more manifolds and ducts for communicating cooling air between the inlet ports and the generator stator.

6. A generator according to claim 5 wherein said ducts include blowers for forcing air to flow toward said generator stator.

7. A method of cooling the stator of a wind turbine generator having a nacelle carrying the stator and a rotor connected to a hub mounting wind turbine blades, comprising the steps of:
   (a) suctioning ambient cooling air moving in a downstream direction through at least one forward-facing inlet port along a surface of the hub or nacelle at a location downstream of the hub and the blades;
   (b) flowing the cooling air through the generator stator in an upstream direction to cool the stator; and
   (c) exhausting the cooling air from the stator at a location downstream of the hub and blades but upstream of said at least one inlet port.

8. A method according to claim 7 including providing a blower to assist the flow of cooling air in the generally upstream direction.

9. A method according to claim 7 wherein step (c) includes reversing the flow of the cooling air from the generally upstream direction to a generally downstream direction to exhaust the cooling air.

10. A method according to claim 7 wherein step (a) includes providing a plurality of inlet ports about the nacelle, step (b) includes flowing the cooling air from the inlet ports through a plurality of ducts to an inlet manifold and flowing the cooling air from the manifold through the stator, and step (c) includes flowing the cooling air from the generator into an annulus for flow in a generally downstream direction.

11. The method of claim 7 wherein, in step (b), the cooling air flows in a generally upstream direction through the generator stator.

12. The method of claim 7 wherein, in step (c), cooling air is exhausted upstream of the stator and inlet port.

* * * * *

UNITED STATES PATENT AND TRADEMARK OFFICE
CERTIFICATE OF CORRECTION

PATENT NO.        : 7,427,814 B2                                            Page 1 of 1
APPLICATION NO.   : 11/385730
DATED             : September 23, 2008
INVENTOR(S)       : Bagepalli et al.

It is certified that error appears in the above-identified patent and that said Letters Patent is hereby corrected as shown below:

At column 5 line 10 claim 5 delete the word "nace" and insert the word --nacelle--

Signed and Sealed this

Twenty-fourth Day of February, 2009

JOHN DOLL
*Acting Director of the United States Patent and Trademark Office*